(12) United States Patent
Rohden (10) Patent No.: US 9,440,719 B2
(45) Date of Patent: Sep. 13, 2016

(54) MAGNUS ROTOR

(75) Inventor: Rolf Rohden, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 735 days.

(21) Appl. No.: 13/822,246

(22) PCT Filed: Sep. 13, 2011

(86) PCT No.: PCT/EP2011/065802
§ 371 (c)(1),
(2), (4) Date: Jun. 3, 2013

(87) PCT Pub. No.: WO2012/034987
PCT Pub. Date: Mar. 22, 2012

(65) Prior Publication Data
US 2013/0243592 A1    Sep. 19, 2013

(30) Foreign Application Priority Data
Sep. 16, 2010 (DE) .......................... 10 2010 040 901

(51) Int. Cl.
*B63H 9/02* (2006.01)

(52) U.S. Cl.
CPC . *B63H 9/02* (2013.01); *Y02T 70/58* (2013.01)

(58) Field of Classification Search
None
See application file for complete search history.

(56) References Cited

U.S. PATENT DOCUMENTS

| | | | |
|---|---|---|---|
| 1,632,322 A | 6/1927 | Stripling | |
| 1,918,007 A * | 7/1933 | Woodruff | B65D 88/12 294/68.3 |
| 4,582,013 A * | 4/1986 | Holland, Jr. | B63H 9/02 114/39.3 |
| 4,602,584 A | 7/1986 | North et al. | |
| 2009/0217851 A1* | 9/2009 | Kind | B63H 9/02 114/39.3 |
| 2009/0241820 A1* | 10/2009 | Rohden | B63H 9/02 114/39.3 |
| 2011/0008167 A1* | 1/2011 | Cummings | F03D 3/005 416/132 A |
| 2014/0137781 A1 | 5/2014 | Rohden | |

FOREIGN PATENT DOCUMENTS

| | | |
|---|---|---|
| AT | 110303 B | 8/1928 |
| CN | 101198516 A | 6/2008 |
| DE | 10 2005 028 447 A1 | 12/2006 |
| DE | 10 2007 003 779 A1 | 7/2008 |
| DE | 10 2006 025 732 B4 | 5/2010 |
| GB | 2 187 154 A | 9/1987 |
| WO | 2010/066946 A2 | 6/2010 |

OTHER PUBLICATIONS

Wagner, Claus D.: Die Segelmaschine. Hamburg. Ernst Kabel Verlag GmbH, 1991, pp. 85, 156-159.—ISBN 3-8225-0158-1.
Unknown author, "Flettner spins again," Ship & Boat International, pp. 41-42, Jul./Aug. 1985.

* cited by examiner

*Primary Examiner* — Ninh H Nguyen
*Assistant Examiner* — Justin Seabe
(74) *Attorney, Agent, or Firm* — Seed IP Law Group PLLC (57) ABSTRACT

Various embodiments provide a Magnus rotor having a carrier arranged in the interior of the Magnus rotor, a rotor which rotates about the carrier in operation of the Magnus rotor, a plate which horizontally closes off the rotor, and a bearing which carries the rotor on the carrier. The rotor has at least one opening in the plate. The carrier has at least one fixing point for lifting the Magnus rotor by means of at least one fixing means and a lifting apparatus.

16 Claims, 6 Drawing Sheets

MAGNUS ROTOR

BACKGROUND

1. Technical Field

The invention concerns a Magnus rotor.

2. Description of the Related Art

Magnus rotors are also referred to as Flettner rotors or sailing rotors.

Magnus rotors are known in the state of the art. Particularly as ship drives, they are also known by the term Flettner rotor and equipping ships with such a Flettner rotor or Magnus rotor is described in the book "Die Segelmaschine" by Klaus D. Wagner, Ernst Kabel Verlag GmbH, Hamburg, 1991.

In that respect what is common to known Magnus rotors is that they are used on ships to produce a propulsion force by virtue of their rotation and the action of a wind force which as far as possible acts transversely relative to the ship. In that respect consideration is always given to operation of the Magnus rotors and the propulsion force which the Magnus rotors can produce in that mode of operation.

As general state of the art attention is directed to the following documents: "Flettner spins again. In: Ship & Boat International, July/August 1985, pages 41 and 42", "WAGNER, Claus D.: Die Segelmaschine. Hamburg. Ernst Kabel Verlag GmbH, 1991, pages 85, 156-159. ISBN 3-8225-0158-1", DE 10 2006 025 732 B4, U.S. Pat. No. 1,632,322 A, DE 10 2005 028 447 and DE 10 2007 003 779 A1.

BRIEF SUMMARY

There is provided a Magnus rotor comprising a carrier arranged in the interior of the Magnus rotor, a rotor which rotates about the carrier in operation of the Magnus rotor, a plate which horizontally closes off the rotor, and a bearing which carries the rotor on the carrier. In that case the rotor has at least one opening in the plate. In addition the carrier has at least one fixing point for lifting the Magnus rotor by means of at least one fixing means and a lifting apparatus.

That makes it possible to fix a lifting apparatus such as a crane or the like to the Magnus rotor in order thereby to lift off the Magnus rotor and replace it by a further Magnus rotor. In that way the time for which the ship cannot be used for maintenance or repair is minimized as the ship can continue its operation with a second Magnus rotor while the first replaced Magnus rotor is maintained or repaired on land.

In that respect it is advantageous that the Magnus rotor can be lifted vertically by the openings and fixing points according to the invention as a result the outer casing of the rotor of the Magnus rotor cannot be affected by work thereon or in particular tensile and pressure forces and possibly changed or damaged thereby as the outer casing is crucial for the propulsion produced by the Magnus rotor, by virtue of the aerodynamic properties of the casing.

It is also advantageous for the fixing points to be provided on the carrier of the Magnus rotor as the delicate rotor of the Magnus rotor, that is to say the outer casing of the latter, is not adversely affected thereby and, when the Magnus rotor is lifted, is also not subjected to the effect of tensile forces which could distort the shape of the outer casing and thereby adversely affect its aerodynamic properties.

In an aspect of the invention the rotor has at least two openings in the plate and the carrier has at least two fixing points. In that way the load acting when the Magnus rotor is lifted can be distributed to two engagement points.

In a further aspect of the invention the rotor has at least one opening or at least two openings in the region with which it is connected to the bearing. In that way the connection between the bearing and the rotor of the Magnus rotor can be in the form of a continuous surface to avoid air turbulence phenomena in the interior of the Magnus rotor. The provision according to the invention of corresponding openings in that connection makes it possible to afford access to the fixing points of the carrier through the openings in the horizontal plate of the rotor of the Magnus rotor in order to be able to pass the fixing means through those openings.

In an aspect of the invention the one opening or the two openings of the plate and the one fixing point or the two fixing points of the carrier can be arranged substantially vertically relative to each other. That provides that the rotor of the Magnus rotor can be positioned in a rotated position in such a way that a lifting apparatus such as a crane arranged above and outside the Magnus rotor can have access vertically to the fixing points of the carrier.

In a further aspect of the invention the one opening in the plate, the one opening in the rotor and the one fixing point of the carrier or each of the two openings in the plate, each of the two openings in the rotor and each of the two fixing points of the carrier are arranged substantially at the same spacing from the vertical axis of rotation of the Magnus rotor. In that way the load when lifting the Magnus rotor is distributed uniformly to avoid tilting when lifting it.

In an aspect of the invention the two openings in the plate, the two openings in the rotor and the two fixing points of the carrier are respectively arranged in a horizontal spacing of substantially 180° relative to each other about the vertical axis of rotation of the Magnus rotor. That is advantageous as in that way, when the Magnus rotor is being lifted, it provides a uniform distribution of load to the fixing points around the center line of the Magnus rotor, on which the center of gravity of the Magnus rotor is disposed when the structure of the Magnus rotor is of a substantially rotationally symmetrical configuration, in order thereby to avoid tilting when the rotor is being lifted.

In an aspect of the invention the carrier has an arresting device to prevent a relative movement between the carrier and the rotor. That is necessary on the one hand to ensure the safety of people who have to pass into the interior of the rotor to mount the fixing means. In addition, when the Magnus rotor is being lifted, rotation of the rotor with respect to the carrier is also absolutely to be avoided in order to prevent the fixing means from being sheared off by a rotary movement.

In a further aspect of the invention the arresting device is a braking device which can act on a drive of the rotor. In that way the brake can be caused to act directly on the drive which in operation of the Magnus rotor causes the rotary movement of the rotor with respect to the carrier. It is thus possible to have a braking action on the drive whereby the brake can be provided directly at the source of the rotary movement, to save space. In addition brakes for drives, in particular drive shafts, are known and are inexpensively available.

In an aspect of the invention the arresting device is a securing device having an arresting means which can radially engage into an opening in the rotor. That provides a simple and reliable arresting system as a secure arresting action can be afforded by engagement of the arresting means in the radial direction into an opening in the rotor, involving the use of simple means. In addition that kind of arresting action is advantageous as the arresting means which engages into the opening is visible from the exterior and it is thus possible to see from the exterior by a simple visual check whether the rotor is or is not secured against relative movement with respect to the carrier.

In a further aspect of the invention the carrier has a drive for driving the rotor, an inverter for feeding the drive with electrical energy, and a control for controlling the drive and/or the inverter. In that way essential components of the Magnus rotor are provided on the carrier, for example in its interior. As a result the Magnus rotor represents a module which can be replaced as a closed system, that is to say as a complete independent system, without having to be substantially modified. Thus the Magnus rotor is replaced as a whole as the individual components of a Magnus rotor are matched to each other, both the mechanical and also the electrical components. That complete replacement means that the Magnus rotor system is not altered but as a whole it can be replaced and maintained or repaired, that is to say restored.

In a further aspect of the invention provided at each of the at least one fixing points is a fixing means which is passed through each of the at least one mutually vertically oriented opening in the plate and opening in the rotor from each of the at least one fixing points of the carrier through the plate, wherein the Magnus rotor can be lifted by means of the fixing means. Lifting of the Magnus rotor is implemented in that way.

BRIEF DESCRIPTION OF THE SEVERAL VIEWS OF THE DRAWINGS

Embodiments by way of example and advantages of the invention are described in greater detail hereinafter with reference to the following Figures.

DETAILED DESCRIPTION

Figure 1:
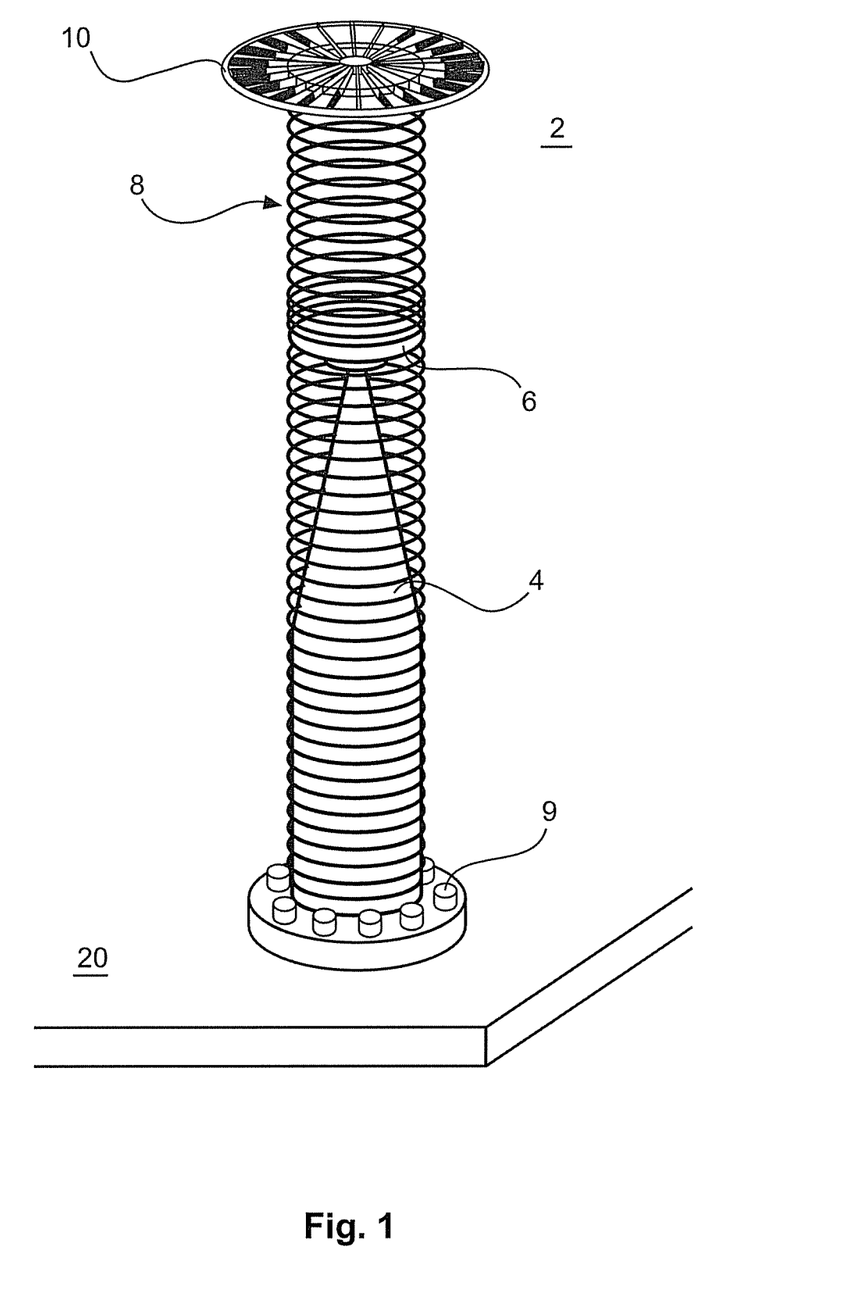
FIG. 1 shows a diagrammatic perspective view of a Magnus rotor.

FIG. 1 shows a diagrammatic perspective view of a Magnus rotor 2. The Magnus rotor 2 has an upper rotating part as the rotor 8 and a lower stationary part as the carrier 4, which are connected together by way of a bearing 6. The rotor 8 is preferably of a cylindrical configuration. An end plate 10 is mounted to the rotor at the upper end thereof. The carrier 4 of the Magnus rotor 2 is fixed on a base plate 20 by way of bolts or screws 9. If the Magnus rotor 2 is mounted for example on the deck of a ship or the like, a corresponding base plate 20 is not required for fixing the carrier 4 as that plate is formed by the deck of the ship or the like itself. In that arrangement the carrier 4 is disposed in the interior of the Magnus rotor 2. The rotor 8 rotates on that carrier 4, by way of a bearing 6. The bearing 6 can be a known rolling bearing or any other suitable bearing configuration.

Figure 2:
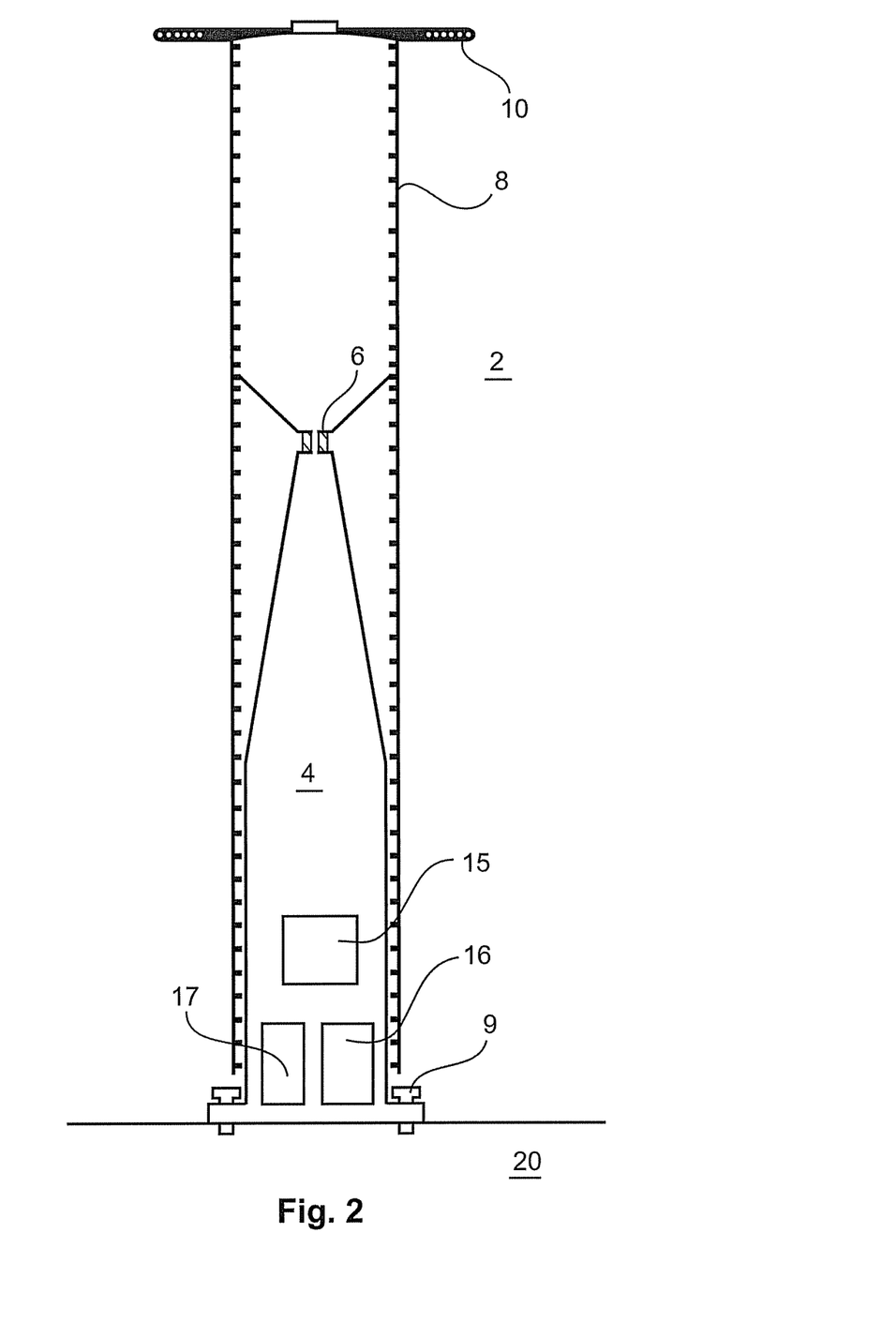
FIG. 2 shows a simplified diagrammatic side view of the Magnus rotor.

FIG. 2 shows a simplified diagrammatic side view of the Magnus rotor 2. Provided in the interior of the carrier 4 are a motor 15 for driving, that is to say rotating, the rotor 8, and a control 16 for controlling the motor 15 together with an inverter 17 for feeding the motor 15. They are provided in the interior of the carrier 4. The Magnus rotor 2 is mounted by bolts or screws 9 on the base plate 20 or a ship deck or the like and has the inwardly disposed carrier 4, the bearing 6, the rotor 8 and the end plate 10, as described and shown in FIG. 1.

Figure 3:
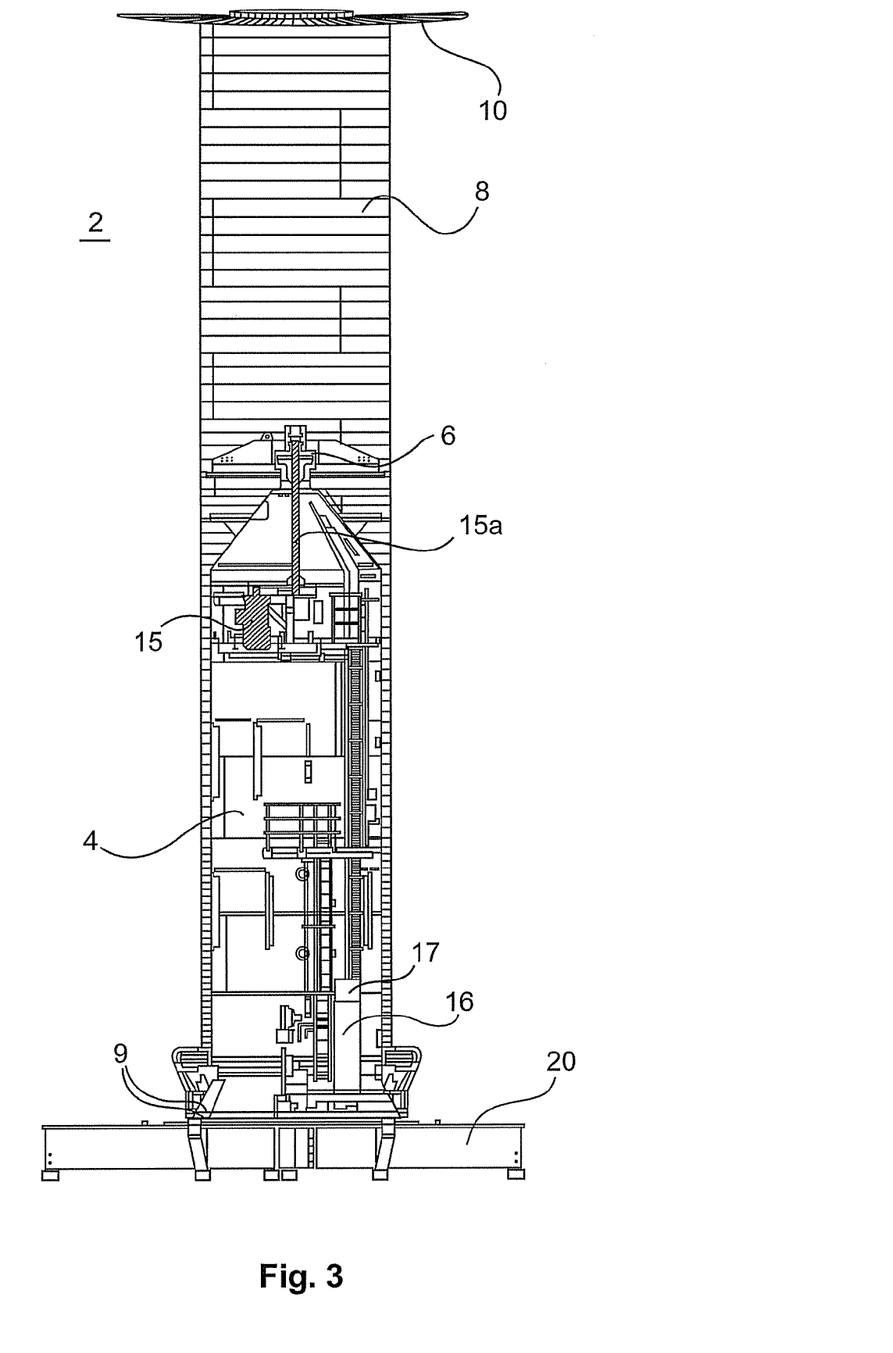
FIG. 3 shows a detailed diagrammatic side view of the Magnus rotor.

FIG. 3 shows a detailed diagrammatic side view of the Magnus rotor 2. In this respect the components in FIGS. 1 and 2 are described and shown with the same references. In this arrangement the motor 15 of the rotor 8 is arranged in the upper region of the stationary carrier 4 so that a shaft 15a of the motor 15 is passed through the bearing 6.

Figure 4:
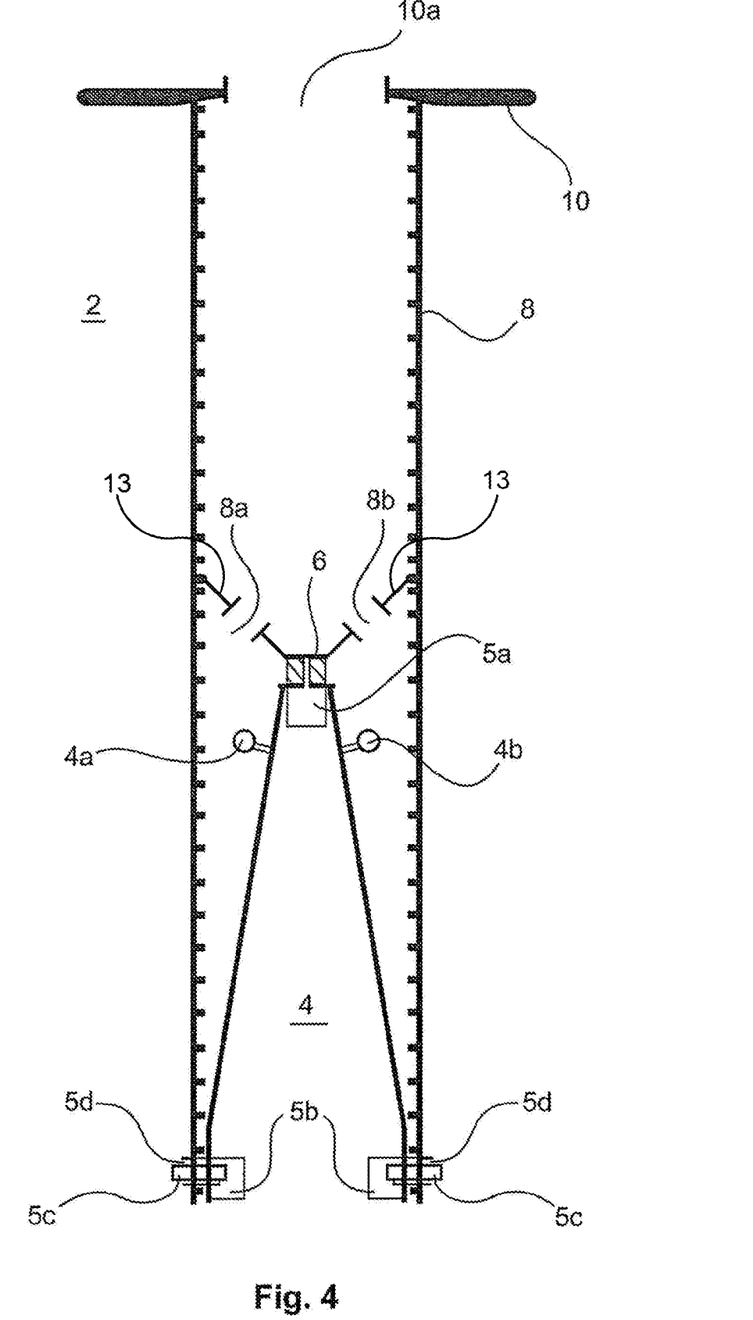
FIG. 4 shows a simplified diagrammatic side view of the upper part of the Magnus rotor.

FIG. 4 shows a simplified diagrammatic side view of the upper part of the Magnus rotor 2. This simplified diagrammatic side view shows the Magnus rotor 2 without base plate 20 and the like as well as bolts or screws 9. The Figure also shows a brake 5a or a securing device 5b which are both provided as alternative options or also jointly for reliably preventing a relative movement between the stationary carrier 4 and the rotating rotor 8. In that case the brake 5a can act on the motor 15. The securing device 5b has a securing element 5c which can be a bolt or pin 5c or the like which is passed radially through an opening 5d in the rotor 8.

An opening 10a is provided in the end plate 10. The opening 10a connects the internal space in the rotor 8 above the bearing 6 to the atmosphere surrounding the Magnus rotor 2. That opening 10a is closable in order to generally be closed, in particular during operation of the Magnus rotor 2. The opening 10a is opened typically in a stationary condition of the rotor 8, in which the rotor 8 is secured by the brake 5a or the securing device 5b, while otherwise the opening is closed, for example screwed fast, in such a way that unwanted opening of the opening 10a is reliably prevented, in particular due to centrifugal forces occurring during operation of the Magnus rotor 2. Alternatively there can also be more than one opening, such as two openings 10a and 10b, as shown hereinafter in FIG. 7.

In accordance with the invention moreover two openings 8a and 8b are provided in the part or member 13 of the rotor 8 which extends over the carrier 4 and connects the outside wall of the rotor 8 to the bearing 6. Like the opening 10a in the end plate 10, those openings can also be opened. That is also intended only in a stationary secured condition of the rotor 8 and those openings 8a and 8b are also secured to prevent accidental opening due to centrifugal forces or other circumstances.

In addition the inwardly disposed carrier 4 has two fixing points 4a and 4b provided at the outside wall of the inwardly disposed carrier 4. In this respect the fixing points 4a and 4b can be pins, eyes, lugs, hooks or the like in order to fix thereto or through same, fixing means such as for example a cable as such or a cable having a hook, a shackle, a loop or the like.

The openings 8a and 8b as well as the fixing points 4a and 4b are all arranged approximately at the same spacing, that is to say at substantially the same radius relative to the center line, that is to say the axis of rotation, of the Magnus rotor 2. The opening 10a is provided radially around that center line. In addition the openings 8a and 8b, the opening 10a and the fixing points 4a and 4b are disposed in each case approximately in the same horizontal plane, that is to say they each have in pair-wise relationship the substantially identical vertical spacing relative to the end plate 10, the bearing 6 or also the base plate 20. The openings 8a and 8b or the fixing points 4a and 4b respectively are arranged in that horizontal plane in mutually displaced relationship approximately at 180°, that is to say they are disposed in each case in pair-wise relationship directly opposite to each other approximately with respect to the center line, that is to say the axis of rotation, of the Magnus rotor 2. The opening 10a is such that its radius around the center line approximately corresponds to the largest spacing of the outer edge of the openings 8a and 8b or is of such a size that the radius of the opening 10a around the center line is greater than the spacing of the fixing points 4a and 4b from the center line in the radial direction.

In this case the two openings 8a and 8b are arranged directly beneath the opening 10a. In general, displacement of the openings 8a and 8b with respect to the opening 10a does not occur as the openings 8a and 8b as well as 10a are provided on component parts of the rotor 8, which are rigidly connected together, that is to say they cannot be shifted or displaced relative to each other. In contrast the fixing points 4a and 4b are provided on the inwardly disposed carrier 4 as a stationary part of the Magnus rotor 2 and the openings 8a and 8b as well as 10a are provided on the rotor 8 as the rotating part of the Magnus rotor 2. Therefore the rotor 8 is to be moved into a given position with respect to the stationary carrier 4 to provide that the fixing points 4a and 4b are disposed in a vertical direction directly beneath the openings 8a and 8b and the opening 10a in the rotor 8.

Figure 7:
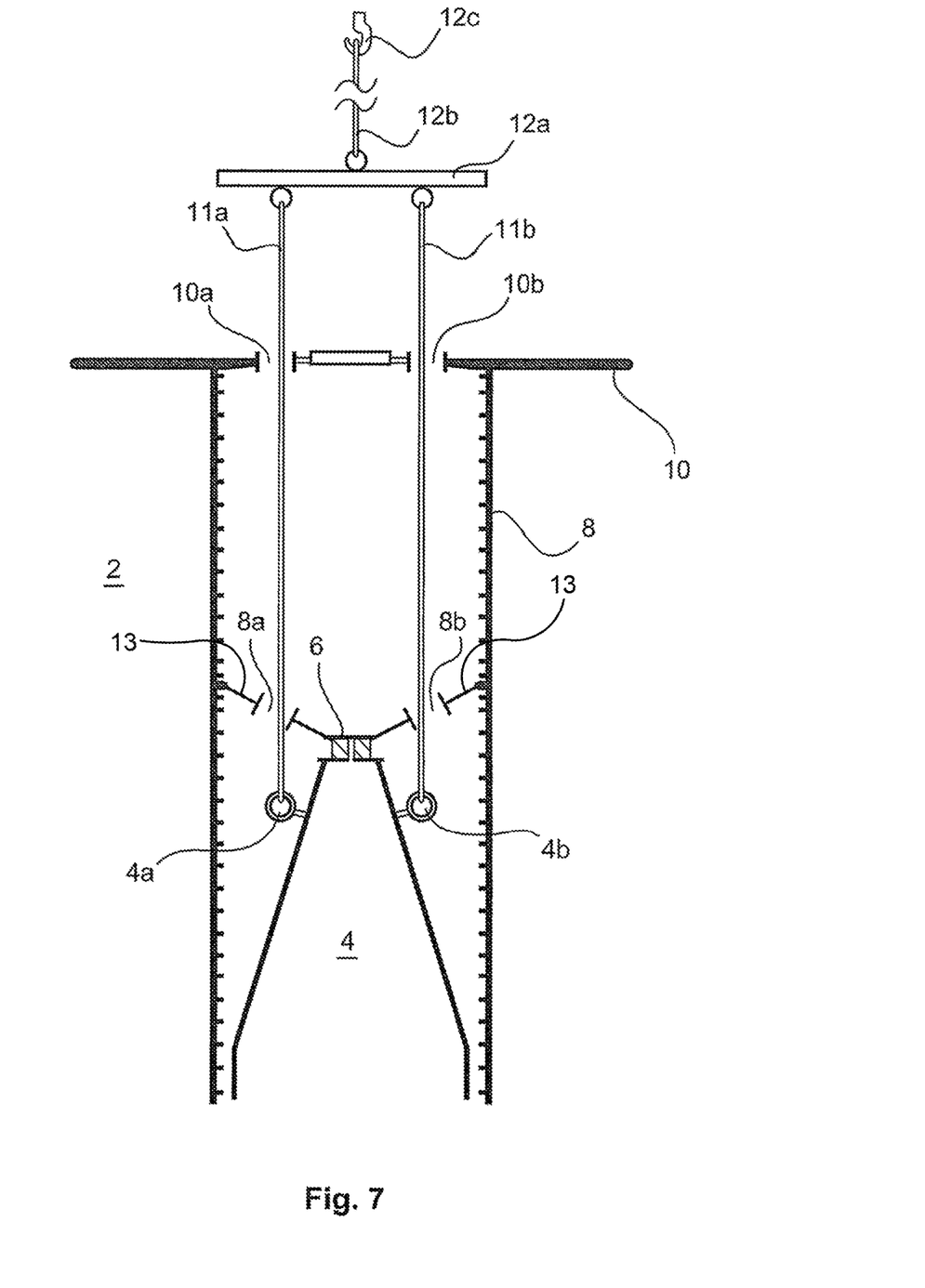
FIG. 7 shows a further simplified diagrammatic side view of the upper part of the Magnus rotor.

If two openings 10a and 10b are provided as shown in FIG. 7 instead of an opening 10a as shown in FIG. 4, they are to be provided in such a fashion that they assume corresponding positions and orientations as well as dimensions in relation to the openings 8a and 8b and the fixing elements 4a and 4b.

Figure 5:
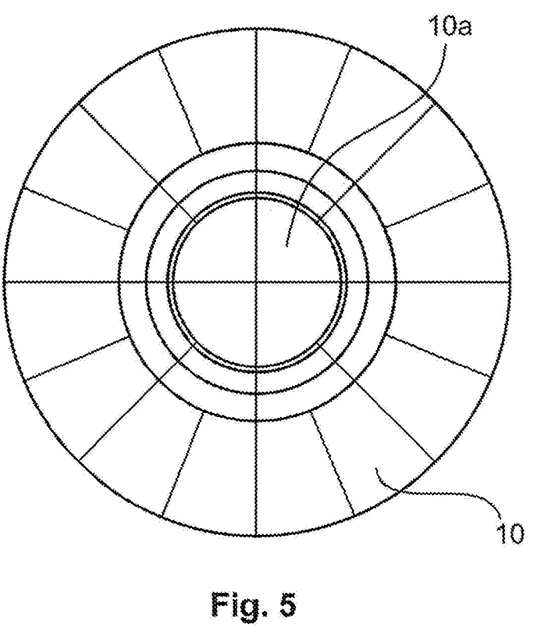
FIG. 5 shows a detailed diagrammatic view of the Magnus rotor from above.

FIG. 5 shows a detailed diagrammatic view of the Magnus rotor 2 from above. This view shows the end plate 10 and the opening 10a therein, the opening 10a being closed in this view.

Figure 6:
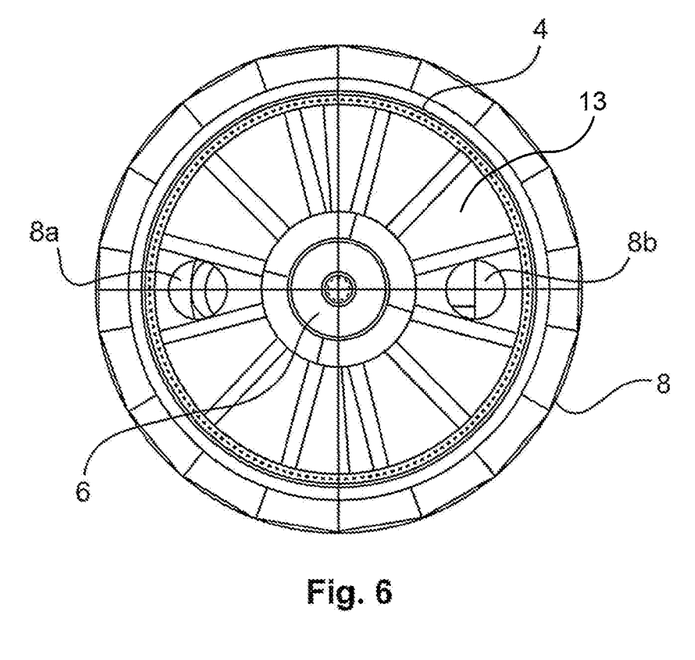
FIG. 6 shows a detailed diagrammatic view of the interior of the Magnus rotor from above.

FIG. 6 shows a detailed diagrammatic view of the interior of the Magnus rotor 2 from above. In this case the bearing 6 is arranged around the center line, that is to say the axis of rotation, of the Magnus rotor 2. The stationary carrier 4 is arranged radially around that center line and beneath the bearing 6. Provided above the carrier and radially therearound is the rotor 8 which is connected to the carrier 4 by means of the bearing 6 and which carries the rotor 8. The two openings 8a and 8b are provided in the part or member 13 of the rotor 8, which extends over the carrier 4 and connects the outer casing of the rotor 8 to the bearing 6.

FIG. 7 shows a further simplified diagrammatic side view of the upper part of the Magnus rotor 2. Instead of the one opening 10a shown in FIG. 4 this view shows two openings 10a and 10b. The Figure shows as the fixing means, two cables 11a and 11b fixed to the fixing points 4a and 4b of the inwardly disposed carrier 4. The openings 8a and 8b as well as 10a and 10b are opened. The cables 11a and 11b are passed from the fixing points 4a and 4b through the openings 8a and 8b and further through the openings 10a and 10b into the outside surroundings of the Magnus rotor 2 and are there fixed for example by a transverse beam member 12a to the hook 12c of a crane by a cable 12b. In this case the cables 11a and 11b are tensioned between the fixing points 4a and 4b of the carrier 4 and the transverse beam 12a of the crane, that is to say they are pulled vertically tight by a force in opposition to the direction of the force of gravity.

In that condition shown in FIG. 7 the Magnus rotor 2 can be lifted by the cables 11a and 11b, for example by a crane 12a, 12b, 12c of a port installation, at which the ship equipped with Magnus rotors 2 has berthed, or also a crane 12a, 12b, 12c provided on the actual ship itself. For that purpose it is necessary to release the bolts or screws 9 of the stationary part, that is to say the inwardly disposed carrier 4, from the base plate 20 or the deck of the ship. In that respect release of those bolts or screws 9 may occur only when the Magnus rotor 2 is reliably secured to prevent it from tilting over, by the tensioned cables 11a and 11b.

In addition further connections between the inwardly disposed carrier 4 and the base plate 20 or the ship are to be separated before the Magnus rotor 2 as a whole can be lifted. Thus connections for the feed and/or discharge of electric current, oil, hydraulic agents, water, compressed air or the like to the motor 15, the control 16 and the inverter 17 are to be disconnected before the Magnus rotor 2 is lifted by a crane 12a, 12b, 12c from the base plate 20 or the deck of the ship.

In order therefore to perform replacement of a Magnus rotor 2, for example for maintenance or repair on land, by another Magnus rotor 2, or to remove at least one Magnus rotor 2 for the above-indicated purposes, the procedure to be adopted is as follows:

In a first step firstly the rotating Magnus rotor 2 is to be shut down, that is to say, brought to a halt. In that respect it is to be ensured that the position in which the rotor is stopped is so selected that the fixing points 4a and 4b of the inwardly disposed carrier 4 in that position are in a vertical direction directly beneath the openings 8a and 8b and openings 10a and 10b in the rotor 8. In addition, for example by a brake 5a or a securing device 5b or the like, it is to be ensured that that stopped position is maintained and the rotor 8 does not move with respect to the stationary carrier 4.

That can be effected by a brake 5a which is arranged for example on the stationary carrier 4 and which can act on the motor 15, in particular the shaft 15a, of the rotor 8 in order to fix it. That can also be effected by a securing device 5b or a plurality of securing devices 5b which is for example provided in the stationary carrier 4 in such a way that it or they secure it for example by means of a securing element 5c which can be passed radially by the securing device 5b from the stationary carrier 4 through an opening 5d in the rotor 8. In that case the shape and dimensions of the securing element 5c, for example the diameter of a pin or bolt 5c, are to be so adapted to the shape and dimensions of the opening 5d in the rotor 8 that relative movement between the stationary carrier 4 and the rotating rotor 8 can be reliably excluded. That is important on the one hand because, when lifting the Magnus rotor 8, high forces act on the cables 11a and 11b and those forces can be transmitted to and damage, in particular deform, the component parts of the Magnus rotor 2 in the event of unwanted rotary movement of the rotating rotor 8 and the stationary carrier 4. In addition the cables 11a and 11b can be sheared off by rotation and the lifted Magnus rotor 2 can then drop down. In addition, when fixing the cables 11a and 11b in the interior of the Magnus rotor 2, it is necessary for people to be positioned in and moving within the interior of the rotor, in particular in regions between the rotor 8 and the stationary carrier 4, and for that reason a relative movement between the rotor 8 and the carrier 4 must be reliably prevented for safety reasons.

In a second step the openings 8a and 8b as well as 10a and 10b are opened and the component parts with which the openings 8a and 8b as well as 10a and 10b are closed such as for example covers or flaps are secured to prevent unwanted closure, for example by falling shut. That securing action is necessary for the safety of the operating staff when performing the operations in the interior of the Magnus rotor 2. In addition, if the covers or flaps were to accidentally close or drop back or slip back, a cable 11a or 11b could be damaged and in the tensioned condition could tear away whereby the entire load of the lifted Magnus rotor 2 would be supported on the remaining cable 11a or 11b. That second remaining cable 11a or 11b could also tear due to that overloading or also due to the impulse produced when the first cable 11a or 11b tears away, and as a result the Magnus rotor 2 could drop down, and as a result itself be severely damaged or even destroyed and it could also damage or destroy the base plate 20 or the ship or the underlying structure of the port installation or the like. The crane 12a, 12b, 12c can also be damaged or destroyed by the impulse produced when the cable rips. In addition, people could also suffer injury as a result. Likewise, in the situation where, when a first cable 11a or 11b snaps, the second cable 11a or 11b does not snap and carries the entire load, snapping of the first cable 11a or 11b can trigger a lateral swinging movement of the lifted Magnus rotor 2 whereby the lifted, laterally swinging Magnus rotor 2 can also damage or destroy the base plate 20, the ship, port installations, the lifting crane 12a, 12b, 12c or the like, or injure people in the area.

In a third step a lifting apparatus 12a, 12b, 12c with two cables 11a and 11b can be lowered by a crane 12a, 12b, 12c through the openings 8a and 8b as well as 10a and 10b to the fixing points 4a and 4b where they are securely fixed. In the situation involving unwanted release or snapping of the cables 11a and 11b from the fixing points 4a and 4b, the area around the lifted Magnus rotor 2 can be endangered in the manner described hereinbefore, and for that reason secure fixing of the cables 11a and 11b at the fixing points 4a and 4b is to be ensured.

In a fourth step the cables 11a and 11b are to be tightened, that is to say tensioned. For that purpose it is firstly to be ensured that there are no longer service personnel in the interior of or on the Magnus rotor 2 to be lifted. In addition the cables 11a and 11b are to be tightened only to such a degree that they do not hang down and, upon release of the bolts or screws 9, can reliably carry the weight of the Magnus rotor 2 without the Magnus rotor 2 being able to tip over. In that respect care is to be taken in particular to ensure that the cables 11a and 11b are tightened to such a degree that no impulse is applied to the cables 11a and 11b due to tipping of the released Magnus rotor 2, as it is precisely this that can lead to the cables 11a and 11b failing.

In a fifth step now the bolts or screws 9 between the carrier 4 and the base plate 20 or the ship or the like are released and removed. Furthermore all other connections, for example for the feed or discharge of media and power, which are passed to the Magnus rotor 2 from the exterior, such as for example the power supply for the motor 15, the control 16 or the inverter 17, are released and removed. When that has been done, the Magnus rotor 2 stands under its own weight on the base plate 20 or the deck of the ship and is securely held against lateral tilting or slipping by the cables 11a and 11b.

In a sixth step the Magnus rotor 2 can be lifted and displaced by a crane 12a, 12b, 12c by the cables 11a and 11b, that is to say removed from the base plate 20 or the deck. In that case the Magnus rotor 2 can then be set down on another base plate or the like and secured there by bolts or screws 9. In that respect, in accordance with the invention, the Magnus rotor 2 is removed as a whole system, that is to say together with the motor 15, the control 16 and the inverter 17 which are provided in the interior of the carrier 4. Removal of a Magnus rotor 2 can be effected without a change to the Magnus rotor system 2, that is to say without the individual components such as for example rotor 8, inwardly disposed carrier 4, motor 15, control 16 and inverter 17 being disconnected from each other. That is advantageous as they are matched to each other and such matching can be maintained, that is to say remains unchanged, by replacement of the Magnus rotor 2 as a whole.

To exchange two Magnus rotors 2 for each other, a second Magnus rotor 2 is now to be conveyed to the location of the removed first Magnus rotor 2. That is done by reversal of the above-indicated steps, for that second Magnus rotor 2.

The removed first Magnus rotor 2 can now be maintained, repaired or renewed, for example on land, in a suitable maintenance and repair installation. In that respect it is advantageous for those measures to be carried out firstly not on a moving ship in the mounted condition of the Magnus rotor 2 and secondly in an installation adapted for same. Thus the movement of the ship, even in port, can cause more difficulty with and can delay the works to be done on the Magnus rotor 2. In addition for that purpose the service personnel, their tools and the materials and in particular spare parts would have to be provided in the port in question in which the ship is disposed. In addition, not all regions and component parts are accessible when a Magnus rotor 2 is in a mounted condition, that is to say ready for operation thereof. In addition then the interior of the bearing 6 would be exposed to the weather, which would not be conducive to repair or maintenance of the bearing 6. Finally, spare parts may also be required, which can only be transported at a disproportionate level of complication and expenditure.

It is therefore advantageous to be able to remove the Magnus rotor 2 as a whole. In that way the ship can be immediately equipped with a second Magnus rotor 2 and put to sea again, while the first replaced Magnus rotor 2 remains in port in the maintenance and repair installation. It is thus possible to avoid having a time for which the ship is laid up, for reasons of maintenance or repair, and the economy of the ship can be improved thereby. In addition the first replaced Magnus rotor 2 can be maintained or repaired in a suitable maintenance and repair installation more easily, better, faster and more advantageously than when those operations are performed in the mounted condition on a ship. In this respect also it is advantageous for the entire Magnus rotor 2 to be removed or replaced as a system, that is to say with the components disposed in the interior of the carrier 4, being the motor 15, the control 16 and the inverter 17, as both the mechanical and also the electrical components of each Magnus rotor 2 are matched to each other and replacement of individual components, insofar as that would be in any way possible by virtue of their arrangement, in particular by being disposed in the interior of the carrier 4, would remove that matching and would make it necessary to perform a re-matching operation, which in part is very complicated and expensive, after the replacement procedure.

The concept of the invention concerns replacement of a Magnus rotor or a Flettner rotor. Replacement is effected by way of cables which gain access to the inner carrier through the uppermost cover of the Magnus rotor, the cover having been removed for that purpose. In that way the entire Magnus rotor can be lifted off the ship and replaced by a new one. For that purpose the corresponding fixing screws at the base of the Magnus rotor and also all electrical connections have to be previously released so that the entire Magnus rotor together with the inverter, control cabinets and so forth is lifted off. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Magnus rotor comprising:
    a rotor body having an upper end that is open and a member in an interior of the rotor body, the member having at least two openings;
    a plate secured to the upper end of the rotor body and having at least two closeable openings that are configured to close off the upper end of the rotor body when closed, the at least two closeable openings being positioned over the at least two openings of the member;
    a carrier arranged in the interior of the rotor body, the carrier including at least two fasteners that are configured to be connected to a lifting apparatus that is configured to lift the Magnus rotor, the member of the rotor body extending over the carrier; and
    a bearing that is connected to the member of the rotor body and to the carrier and allows the rotor body to rotate relative to the carrier.

2. The Magnus rotor according to claim 1 wherein the at least two closeable openings of the plate and the at least two fasteners of the carrier are substantially vertically aligned relative to each other.

3. The Magnus rotor according to claim 1 wherein the at least two closeable openings in the plate, the at least two openings in the member of the rotor body, and the at least two fasteners of the carrier are arranged substantially at a same spacing from a vertical axis of rotation of the Magnus rotor.

4. The Magnus rotor according to claim 1 wherein the at least two closeable openings in the plate, the at least two openings in the member of the rotor body, and the at least two fasteners of the carrier are respectively arranged in a horizontal spacing of substantially 180° relative to each other about a vertical axis of rotation of the Magnus rotor.

5. The Magnus rotor according to claim 1 wherein the carrier has an arresting device configured to prevent a relative movement between the carrier and the rotor body.

6. The Magnus rotor according to claim 5 wherein the arresting device is a braking device that can act on a drive of the rotor body.

7. The Magnus rotor according to claim 5 wherein the arresting device includes arresting means that can radially engage into an opening in the rotor body.

8. The Magnus rotor according to claim 1 wherein the carrier includes:
    a drive for driving the rotor body,
    an inverter for feeding the drive with electrical energy, and
    a control for controlling at least one of the drive and the inverter.

9. The Magnus rotor according to claim 1 wherein provided at each of the at least two fasteners is a fixing means that is passed through one of the at least two closeable openings of the plate and one of the at least two openings of the member of the rotor body,
    wherein the Magnus rotor can be lifted by means of the fixing means and the lifting apparatus.

10. A cargo ship, comprising:
    a Magnus rotor that includes:
        a rotor body having an upper end and a member in an interior of the rotor body, the member having an opening;
        a plate secured to the upper end of the rotor body and having a closable opening configured to provide access to the interior of the rotor body, the closeable opening being positioned over the opening of the member; and
        a carrier arranged in the interior of the rotor body, the carrier including at least one fastener that is configured to be connected to a lifting apparatus that is configured to lift the Magnus rotor, the member of the rotor body extending over the carrier.

11. A method of lifting a Magnus rotor, the method comprising:
    in a stationary condition of the Magnus rotor, aligning a closed first opening in a horizontal plate located over a rotor of the Magnus rotor, a second opening in a member of the rotor that is in an interior of the rotor of the Magnus rotor, and a fastener of a carrier in the interior of the rotor of the Magnus rotor vertically relative to each other, the member of the rotor extending over the carrier;
    opening the first opening in the horizontal plate,
    passing a portion of a lifting apparatus through the first opening in the horizontal plate and the second opening in the member of the rotor;
    fixing the portion of the lifting apparatus to the fastener of the carrier; and
    using the lifting apparatus to lift the Magnus rotor.

12. The method according to claim 11 further comprising aligning a plurality of closed openings in the horizontal plate, a plurality of openings in the member of the rotor, and a plurality of fasteners of the carrier.

13. The method according to claim 11 wherein the fixing of the portion of the lifting apparatus to the fastener includes fixing a cable to the fixing point.

14. The cargo ship according to claim 10 wherein the at least one fastener is one of a pin, an eye, a lug, and a hook.

15. The cargo ship according to claim 10 wherein the member of the rotor body connects to the carrier by a bearing.

16. The cargo ship according to claim 10 wherein the opening of the member is configured to align with the closeable opening of the plate.

* * * * *